United States Patent
Rhoads et al.

(10) Patent No.: US 6,704,869 B2
(45) Date of Patent: Mar. 9, 2004

(54) EXTRACTING DIGITAL WATERMARKS USING LOGARITHMIC SAMPLING AND SYMMETRICAL ATTRIBUTES

(75) Inventors: Geoffrey B. Rhoads, West Linn, OR (US); Ravi K. Sharma, Hillsboro, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 10/202,367

(22) Filed: Jul. 22, 2002

(65) Prior Publication Data

US 2003/0039377 A1 Feb. 27, 2003

Related U.S. Application Data

(63) Continuation of application No. 09/566,533, filed on May 8, 2000, now Pat. No. 6,424,725, which is a continuation-in-part of application No. 09/452,023, filed on Nov. 30, 1999, now Pat. No. 6,408,082, and a continuation-in-part of application No. 08/746,613, filed on Nov. 12, 1996, now Pat. No. 6,122,403, said application No. 09/566,533, is a continuation-in-part of application No. 09/186,962, filed on Nov. 5, 1998, which is a continuation of application No. 08/649,419, filed on May 16, 1996, now Pat. No. 5,862,260.

(51) Int. Cl.$^7$ .............................. H04L 9/00; G06K 9/00
(52) U.S. Cl. ...................................... 713/176; 380/202
(58) Field of Search .......................... 713/176; 380/202, 380/205, 236, 237, 252, 100, 276; 382/100, 276

(56) References Cited

U.S. PATENT DOCUMENTS

| | | | |
|---|---|---|---|
| 5,613,004 A | 3/1997 | Cooperman et al. | |
| 5,687,191 A | * 11/1997 | Lee et al. | ............... 375/216 |
| 5,835,639 A | 11/1998 | Honsinger et al. | |
| 5,859,920 A | 1/1999 | Daly et al. | |
| 5,862,260 A | 1/1999 | Rhoads | |
| 5,930,369 A | 7/1999 | Cox et al. | |
| 6,078,664 A | * 6/2000 | Moskowitz et al. | ............ 380/28 |
| 6,128,401 A | 10/2000 | Suzuki et al. | |
| 6,208,735 B1 | 3/2001 | Cox et al. | |
| 6,233,347 B1 | 5/2001 | Chen et al. | |
| 6,240,121 B1 | * 5/2001 | Senoh | ......................... 375/130 |
| 6,370,258 B1 | 4/2002 | Uchida | |
| 6,408,082 B1 | 6/2002 | Rhoads et al. | |
| 6,424,725 B1 | 7/2002 | Rhoads et al. | |

FOREIGN PATENT DOCUMENTS

EP   0 977 434   * 2/2000   .......... H04N/5/913

OTHER PUBLICATIONS

Pereira et al, "Template Based Recovery of Fourier–Based Watermarks Using Log–polar and Log–log Maps", 1999, IEEE, pp. 870–874.*

Bender et al., "Techniques for Data Hiding," SPIE vol. 2420, Jan. 1995, pp. 164–173.

(List continued on next page.)

Primary Examiner—Matthew Smithers
(74) Attorney, Agent, or Firm—Joel R Meyer; Digimarc Corporation

(57) ABSTRACT

A digital watermark reader performs a logarithmic sampling of a watermarked media signal to produce a sampled signal. It then analyzes the sampled signal to detect attributes associated with a watermark signal. It extracts a digital watermark based on detected attributes associated with the watermark signal. As an alternative or in addition to these operations, the watermark reader performs a polar sampling of the media signal. For example, polar sampling may be used to address rotational distortion. Another digital watermark reader transforms the media signal to a transform domain, and analyzes the transformed media signal to detect a symmetrical attribute associated with a watermark signal. The method extracts the digital watermark based on detected attributes associated with the watermark signal.

22 Claims, 5 Drawing Sheets

OTHER PUBLICATIONS

Bender et al., "Techniques for Data Hiding," IBM Systems Journal, vol. 35, Nos. 3&4, 1996, pp. 313–336.

Cox et al., "Secure Spread Spectrum Watermarking for Multimedia," NEC Research Institute Technical Report, Dec. 5, 1995, 33 pages.

Matsui et al., "Embedding a Signature to Pictures Under Wavelet Transformation," Transactions of the Institute of Electronics Information and Communication Engineers D–II, vol. J79D–II, No. 6, Jun., 1996, pp. 1017–1024.

Meerwald et al., "A Survey of Wavelet–Domain Watermarking Algorithms," Proc. of SPIE vol. 4314 (2001), pp. 505–516.

Ohnishi et al., Embedding a Seal into a Picture Under Orthogonal Wavelet Transform, Proceedings of Multimedia '96, 1996, IEEE, pp. 514–521.

ORuanaidh et al, "Watermarking Digital Images for Copyright Protection," http://www.kalman.mee.tcd.ie/people/jjr/eva_pap.html, Feb. 2, 1996, 8 pages. (Also published Aug., 1996, IEE Proceedings—Vision, Image and Signal Processing, vol. 143, no. 4, pp. 250–256.).

Ó Ruanaidh, et al., Phase Watermarking of Digital Images. Proc ICIP–96, Lausanne, Switzerland, Sep. 16–19, 1996. p. 239–242.

O'Ruanaidh et al., "Rotation, Scale and translation Invariant Digital Image Watermarking," Int. Conf. on Image Proc., Oct. 1997 IEEE, pp. 536–539.

O'Ruanaidh et al., "Rotation, Scale and Translation Invariant Spread Spectrum Digital Image Watermarking," Signal Processing 66, May 1, 1998, pp. 303–317.

O'Ruanaidh et al., "Rotation, Scale and Translation Invariant Digital Image Watermarking," submitted to Signal Processing, Aug. 21, 1997, pp. 2–19.

Pereira et al., Template Based Recovery of Fourier–Based Watermarks Using Log–Polar and Log–Log Maps, Proc. IEEE Int. Conf. on Multimedia Computing and Systems, 1999, Part vol. 1, pp. 870–874.

Sheng et al., "Experiments on Pattern Recognition Using Invariant Fourier–Mellin Descriptors," *Journal of Optical Society of America*, vol. 3, No. 6, Jun., 1986, pp. 771–776.

\* cited by examiner

EXTRACTING DIGITAL WATERMARKS USING LOGARITHMIC SAMPLING AND SYMMETRICAL ATTRIBUTES

RELATED APPLICATION DATA

This application is a continuation of Ser. No. 09/566,533, filed May 8, 2000 now U.S. Pat. No. 6,424,725, which is a continuation-in-part of application Ser. No. 09/452,023, filed Nov. 30, 1999 (now U.S. Pat. No. 6,408,082). Patent application Ser. No. 09/566,533 is also a continuation-in-part of application Ser. No. 08/746,613, filed Nov. 12, 1996 (now U.S. Pat. No. 6,122,403). Patent application Ser. No. 09/566,533 is also a continuation-in-part of copending application Ser. No. 09/186,962, filed Nov. 5, 1998, which is a continuation of application Ser. No. 08/649,419, filed May 16, 1996 (now U.S. Pat. No. 5,862,260).

The subject matter of the present application is also related to that of the assignee's other patents and applications, including U.S. Pat. Nos. 5,930,377, 5,809,160, 5,721,788, 5,745,604, 5,768,426, 5,850,481, 5,748,753, 5,710,834, 5,636,292, 5,841,978, 5,841,886, 5,832,119, 5,822,436, 5,862,260, and pending applications Ser. Nos. 08/951,858, 08/967,693, 09/074,034, 09/127,502, 09/151,492, 09/185,380, 09/292,569, 09/314,648, 09/337,590, 09/343,104, 09/342,688, 09/343,101, 09/342,971, 09/342,689, 09/408,026, 09/433,104, 60/163,332, 09/434,757, 09/437,357, 60/164,619, 09/452,021, 09/452,022, 60/112,955, 60/134,782, 09/503,881 and 60/158,015. The technology disclosed in this application can advantageously be used in the methods and systems disclosed in the foregoing patents and applications (all of which are incorporated by reference).

TECHNICAL FIELD

The invention relates to multimedia processing, and more specifically relates to detecting embedded code signals in media such as images, video and audio.

BACKGROUND AND SUMMARY

Digital watermarking is a process for modifying media content to embed a machine-readable code into the data content. The data may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including documents (e.g., through line, word or character shifting), software, multi-dimensional graphics models, and surface textures of objects.

Digital watermarking systems have two primary components: an embedding component that embeds the watermark in the media content, and a reading component that detects and reads the embedded watermark. The embedding component embeds a watermark pattern by altering data samples of the media content in the spatial or frequency domains. The reading component analyzes target content to detect whether a watermark pattern is present. In applications where the watermark encodes information, the reader extracts this information from the detected watermark.

One challenge to the developers of watermark embedding and reading systems is to ensure that the watermark is detectable even if the watermarked media content is corrupted in some fashion. The watermark may be corrupted intentionally, so as to bypass its copy protection or anti-counterfeiting functions, or unintentionally through various transformations that result from routine manipulation of the content (e.g., digital to analog conversion, geometric distortion compression, etc.). In the case of watermarked images, such manipulation of the image may distort the watermark pattern embedded in the image. In general, the geometric distortion may result in some linear or non-linear geometric transformation. An affine transformation encompasses various linear transformations, including scale, translation, rotation, differential scale, and shear.

To accurately detect and read the watermark, it is helpful to determine the parameters of this affine transformation. The reader may then use these parameters to adjust the corrupted image to approximate its original state and then proceed to read the information content represented in the watermark.

Watermarks are often difficult to detect and read in corrupted media, particularly if the original un-marked media is not available to assist in the detection and reading process. Thus, there is a need to develop techniques for accurately detecting the presence and orientation of a watermark in corrupted media where the original media is not available.

In some applications, it is useful to determine whether a media signal, such as an audio, image or video signal has been transformed, and if so, how it has been transformed. Methods capable of determining alteration of a signal are useful in a variety of applications, including forensics and encoding auxiliary messages in media. In some applications, there is a need to be able to restore a media signal to its original state in addition to detecting alteration.

The invention provides various methods and related software for extracting digital watermarks from media signals, including image and audio signals. One aspect of the invention is a method of extracting a digital watermark in a media signal. This method performs a logarithmic sampling of the media signal to produce a sampled signal. It then analyzes the sampled signal to detect attributes associated with a watermark signal. It extracts the digital watermark based on detected attributes associated with the watermark signal.

As an alternative or in addition to these operations, the method performs a polar sampling of the media signal. For example, polar sampling may be used to address rotational distortion.

Another aspect of the invention is a method of extracting a digital watermark with symmetrical properties. This method transforms the media signal to a transform domain, and analyzes the transformed media signal to detect a symmetrical attribute associated with a watermark signal. The method extracts the digital watermark based on detected attributes associated with the watermark signal.

In addition to these aspects of the invention, the disclosure describes a method and system of determining a transformation of a media signal subsequent to the encoding of an embedded code signal into the media signal. It also provides a method and system to determine the orientation of the embedded code signal in a media signal after the media signal has been transformed. The invention applies to various types of media signals, including image, video and audio signals.

The disclosure describes a method of determining a transformation of a media signal having an embedded code signal. The method performs a logarithmic sampling of the media signal to create a sampled signal in which scaling of the media signal is converted to translation in the sampled signal. It then computes the translation of the embedded code signal in the sampled signal to determine scaling of the media signal subsequent to the encoding of the embedded signal in the media signal.

The embedded code signal may be implemented in a variety of ways. In one implementation, the embedded code signal comprises a set of impulse functions in a frequency domain. In particular, the impulse functions may be in a Fourier domain, or some other transform domain such as wavelet, Discrete Cosine Transform, etc. For some applications, the impulse functions have random or pseudo-random phase. When the impulse functions have random phase, they tend to make the embedded code signal imperceptible or less perceptible. For instance, the embedded code signal may be an imperceptible or substantially imperceptible digital watermark in an image or audio signal.

Using the embedded code signal's phase attributes, a detection process can determine the position of the embedded code signal or the translation of the media signal in which it is embedded. For example, the detection process may be used to determine a shift, offset, or cropping of the media signal after it has been encoded with the embedded code signal. In particular, the detection process may perform phase matching between the code signal and a media signal suspected of containing an embedded code signal (a suspect signal). One form of phase matching is a matched filtering process between the code signal and the suspect media signal in the spatial or temporal domain. This process may be performed on one dimensional signals such as audio signals, or two or more dimensional signals like images and video.

The logarithmic sampling may be performed directly on the media signal or after it has been converted to a transform domain. For example, one implementation performs the sampling on frequency domain data of the media signal. Depending on the nature of the media signal and the application, the sampling may be performed in two or more dimensions. A two-dimensional signal, such as an image, may be logarithmically sampled in each of the two dimensions to determine scaling in each dimension. A three dimensional signal, such as a video sequence, may be logarithmically sampled in three dimensions. After sampling, matched filtering, or other forms of filtering, may be used to determine the translation of the embedded code signal in the sampled signal in each of the dimensions. The extent of translation in the sampled signal corresponds to scaling in the media signal.

Polar sampling may also be used to convert rotation of a media signal into translation in polar coordinates. Once converted in this manner, matched filtering may be used to determine translation of the embedded code signal in the sampled signal. The translation in polar coordinates provides the angle of rotation of the media signal subsequent to encoding of the embedded code signal.

Logarithmic sampling may also be performed in combination with a polar sampling. The logarithmic or polar sampling may be performed on the media signal directly (e.g., in its native spatial, or temporal domain) or on frequency domain or other transform domain data of the media signal. Similarly, the embedded code signal, or components of it, may be defined in the spatial or frequency domain, or in a transform domain. One example of an embedded code signal is a watermark signal with fixed attributes that can be located via matched filtering in the sampled media signal.

Further advantages and features of the invention will become apparent with reference to the following detailed description and accompanying drawings.

DETAILED DESCRIPTION

Introduction

A watermark provides a mechanism for imperceptibly embedding information into digital media content. Media content includes various forms of data represented as a collection of digital samples that may be altered without disrupting the function or appearance of the data in a perceptible way. Watermarking is particularly suited for visual and audio media such as images, video and sound, yet it applies to other data forms as well. It may be performed in the digital and analog domains.

The watermark is "imperceptible" from the standpoint that it makes minor alterations to media samples that are generally not noticeable to the user. The degree to which the watermark is imperceptible at playback depends on the implementation and the requirements of the application. In some applications, it may be sufficient that the watermark is virtually imperceptible even though one might discern it upon closer scrutiny. Also, some applications may utilize an imperceptible watermark along with perceptible markings to help detect the watermark or determine its orientation.

Digital watermarking systems are sometimes classified based on how they alter the underlying media content to embed information. Some systems directly alter data samples in the domain in which the media is presented as output while other systems transform the data into another domain and then alter the transformed samples. In watermarking of digital images for example, the system may alter discrete pixel values in the spatial domain, or it may transform the image into discrete spatial frequency components and alter the frequency components. In the image field alone, there are many different types of transforms to different domains, such as a discrete cosine transform (DCT), Fourier transform, Karhunen-Loeve transform (KLT), wavelet transform etc. The embedding component of a watermarking system may embed a watermark pattern in any of these domains and then convert the watermarked media back to its original form. Similarly, the embedding component may transform a watermark pattern from one domain to the output domain of the target media content (e.g., spatial domain for images) and combine the transformed pattern with the original media content to create a watermarked version of the target media.

Using Fourier Mellin Transform in Watermark Detection

Figure 1:
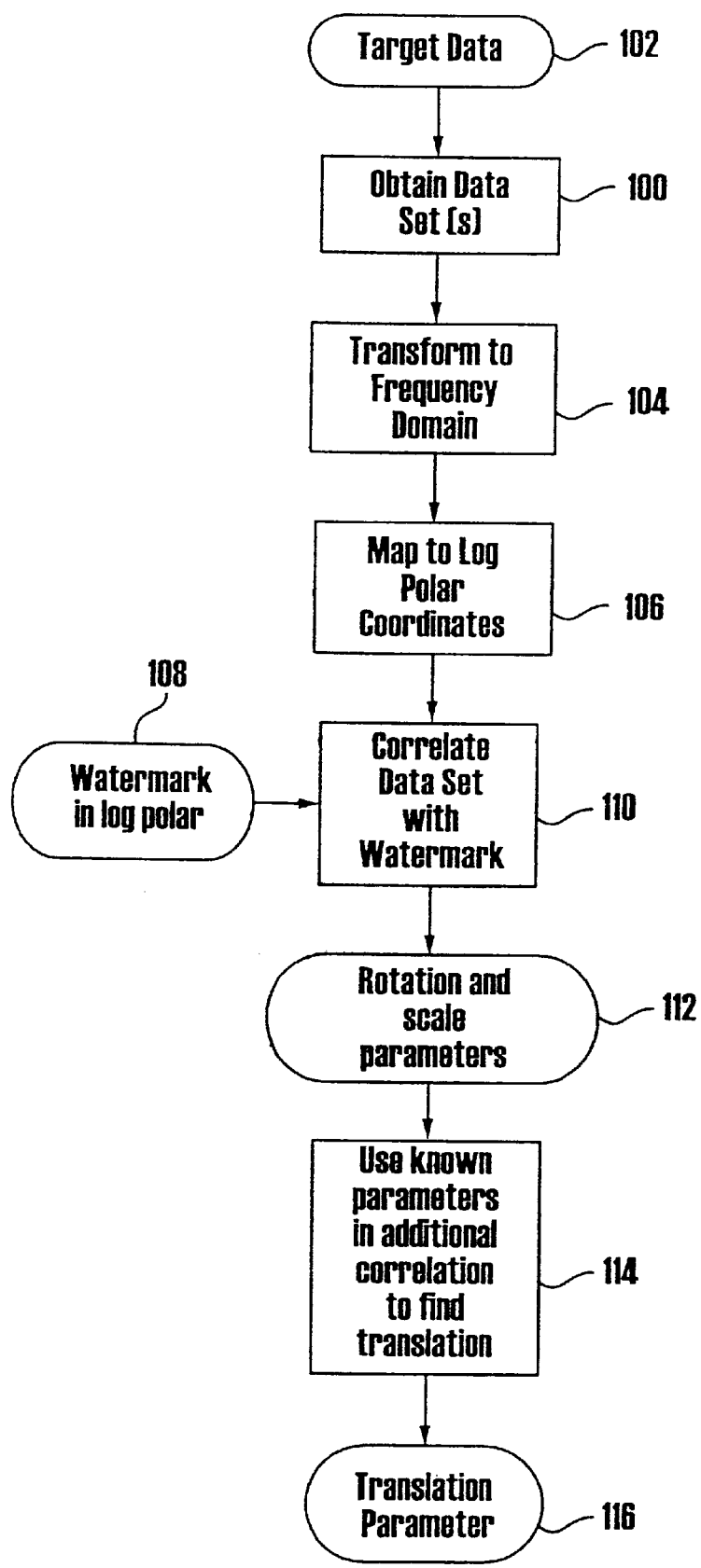
FIG. 1 is a flow diagram illustrating an overview of an implementation of a watermark detection process.

The following sections describe a watermark detection process that employs a Fourier Mellin Transform. For the purpose of this discussion, the process is adapted to detecting a watermark in an image. A similar process may be used for other empirical data sets such as audio and video. FIG. 1 is a flow diagram illustrating an overview of an implementation of the detection process. The following sections cross-reference the diagram through reference numbers.

The objective of the detection process shown in FIG. 1 is to determine whether a watermark is present, and if so, its orientation within the target image. The orientation approximates a geometric transform that the original media content has experienced as a result of intentional or unintentional corruption.

Capturing Data Sets

The detection process begins by capturing one or more data sets from the target data (100, 102). In the case of an image, the target data is an image (the target image 102), and the data sets are blocks of pixels taken from this image.

Transform Data Set to Frequency Domain

Next, the detection process transforms the data sets into the frequency domain (104). In particular, it performs a fourier transform of an image block from the spatial domain to a spatial frequency domain.

Noise Reduction Functions

The process may optionally apply one or more preprocessing functions to reduce the impact of unwanted noise on the detection process. For example, in one implementation, the detection process adds two or more image blocks together to increase the embedded signal to noise ratio (the addition may be performed in the spatial or some other transform domain). Filtering may also be employed to attenuate signal having little, if any, watermark information.

Transform to Log Polar Coordinate System

Next, the process transforms the data set (which may contain a transformed watermark) to a log polar coordinate system (106). By converting to the log polar domain, rotation and scale are converted to translation. One implementation performs a Fourier Mellin transform to map the data set from the spatial frequency domain to a log-polar coordinate system. For other types of signals, a similar mapping of the data set may be employed. For audio signals, the detector may perform a logarithmic sampling of audio data (e.g., a logarithmic sampling of frequency domain audio data) to convert scaling into translation. For video signals, the detector may perform a log-log-log transformation or a log-polar-log transformation of the two spatial coordinates (horizontal and vertical directions within an image), and temporal coordinates, respectively.

Correlation with the Watermark Pattern to Find Rotation and Scale

At this stage, the detection process correlates the watermark pattern (108) with the data set in the log-polar coordinate system to find rotation and scale parameters (110, 112). A variety of correlation processes may be used to implement this phase. For example, there is a general class of such correlation processes that are referred to as generalized matched filters. One implementation employs a generalized matched filter to determine the rotation and scale parameters for the block of interest. Alternatively, one may employ specialized correlation filters to perform correlation. The location in log polar space that provides the highest measure of correlation provides an estimate of the rotation and scale parameters.

Using Rotation and Scale to Get Translation

Having determined rotation and scale parameters, the detection process proceeds to conduct further correlation to find the translation parameter for the block of interest (114). Using the rotation and scale parameters as a starting point, the detection process conducts additional block matching on the spatial image data to determine the translation parameters (116). In particular, one implementation rotates and scales the block of interest and then searches the block to find the location within the block that most closely matches the watermark pattern. This location provides the translation parameters, e.g., the coordinates of a reference position within the block.

Example Implementation

Figure 2:
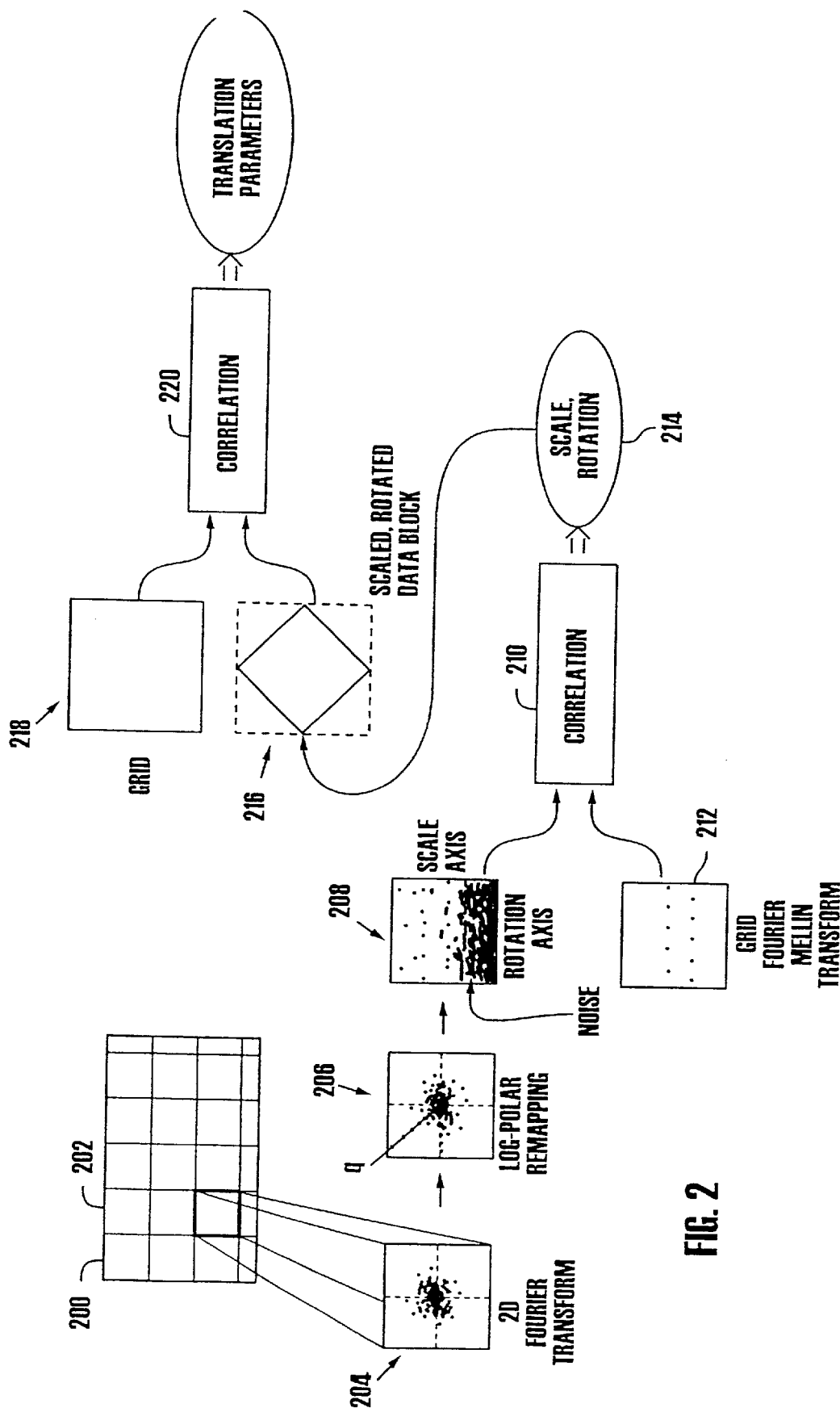
FIG. 2 depicts the detection process shown in FIG. 1 as applied to an image.

FIG. 2 depicts the detection process shown in FIG. 1 as applied to an image. In the detector implementation illustrated in FIG. 2, the target image is divided into blocks of pixels, which form the data sets for the detection process. The implementation supports blocks of varying sizes, but typically, they are N by N, such as 32 by 32, 64 by 64, 96, by 96, 128 by 128, etc. The detection process operates on these data sets to look for a watermark, and if one is identified, to compute an orientation vector.

Before elaborating on implementation details, it is helpful to begin with an overview of the watermark structure. As noted above, the watermark may be implemented in a variety of ways. In the context of images, for example, it may be applied to the original content in the spatial domain, in a frequency domain, or some combination of these domains. The specific values of the watermark used to alter discrete samples of the image may be expressed in the spatial or frequency domain. For example, the watermark samples may be expressed as having some value and location in the spatial and or frequency domain. In addition, the value of a watermark sample may be a function of position in a given domain and may be a function of the corresponding image sample that it alters. For example, it may be expressed as a "delta function" that alters the corresponding image sample depending on the value of that image sample. For additional description of watermark encoding, please see copending application Ser. Nos. 09/503,881 and 09/452,021, which are hereby incorporated by reference.

Components of the watermark may perform the function of conveying information content, identifying the watermark's orientation, or both of these functions. The detection process is primarily concerned with the watermark's ability to identify its orientation.

Figure 3:
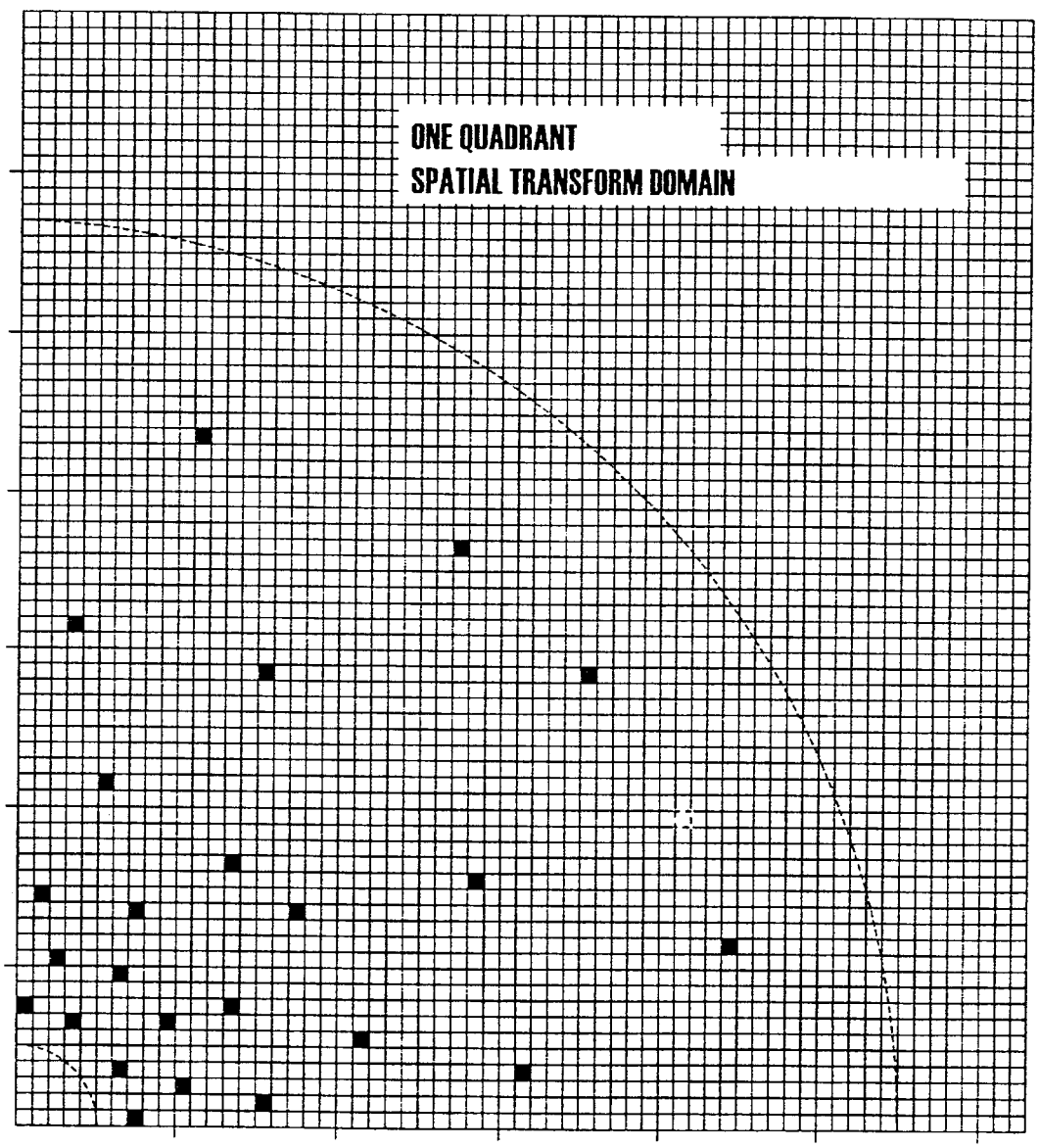
FIG. 3 illustrates an example of a watermark component used to identify the presence and orientation of the watermark in a target image.

The watermark used in the implementation illustrated in FIG. 2 has an orientation signal component that helps identify the watermark's orientation in a corrupted image. FIG. 3 illustrates one quadrant of an example orientation component in a spatial frequency domain, namely Fourier transform domain (other transform domains may be used as well). The points in the plot represent impulse functions (also referred to as orientation points), indicating signal content of the detection watermark signal. The pattern of orientation points for the illustrated quadrant is replicated in all four quadrants, though such quadrant replication is not necessary in all applications. There are a number of properties of the detection pattern that impact its effectiveness for a particular application. The selection of these properties is highly dependent on the application.

One property is the extent to which the pattern is symmetric about one or more axes. For example, if the detection pattern is symmetrical about the horizontal and vertical axes, it is referred to as being quad symmetric. If it is further symmetrical about diagonal axes at an angle of 45 degrees, it is referred to as being octally symmetric (repeated in a symmetric pattern 8 times about the origin). Such symmetry aids in identifying the watermark in a suspect signal, and aids in extracting the rotation angle. However, in the case of an octally symmetric pattern, the detector includes an additional step of testing which of the four quadrants the orientation angle falls into.

Also, impulse functions defined in the Fourier transform domain should have conjugate symmetry so that they map to a real image in the spatial domain.

The orientation points shown in the example of FIG. 3 are magnitude components in a frequency domain. In particular, FIG. 3 depicts a Fourier domain. However, in other implementations, an embedded signal component may be defined in other transform domains as well, such as a wavelet transform or Discrete Cosine Transform domain.

The impulse functions may have random, or more particularly, "pseudo random" phase. Pseudo random refers to the case where the impulse functions or other orientation signal components have random phase, yet the phase of each component is known. The known phase attributes enable automated detection processes to determine the position of a watermark in a suspect signal, even in cases where the signal has been translated (shifted, offset) subsequent to encoding of the watermark. This type of misregistration occurs, for example, where the detection process starts at some arbitrary location in an audio or image signal, or the signal has been clipped, shifted or offset.

Another criterion is the position of the orientation points and the frequency range that they reside in. Preferably, the orientation points fall in a mid frequency range. If they are located in a low frequency range, they may be noticeable in the watermarked image. If they are located in the high frequency range, they are more difficult to recover. Also, they should be selected so that scaling, rotation, and other manipulation of the watermarked signal does not push the orientation points outside the range of the detector. Finally, the orientation points should preferably not fall on the vertical or horizontal axes, and each orientation point should have a unique horizontal and vertical location.

While FIG. 3 depicts a two-dimensional orientation signal, orientation signals may be one dimensional (a one-dimensional signal, e.g., a set of impulses in one dimension, for audio signals) or have more than two dimensions (e.g., a collection of functions that span three dimensions such as a set of two-dimensional impulse functions as in FIG. 3 that change in position or magnitude over time).

As explained below, the detector performs correlation processes between this orientation pattern (or a transformed version of it) and transformed data sets extracted from the target image.

Returning to the process depicted in FIG. 2, the detector segments the target image into blocks (e.g., 200, 202) and then performs a 2-dimensional fast fourier transform (2D FFT) on each block. This process yields a 2D transform of the magnitudes of the image content of the block in the spatial frequency domain as depicted in the plot 204 shown in FIG. 2.

Next, the detector process performs a log polar sampling of the transformed block. The type of sampling in this implementation is referred to as a Fourier Mellin transform. The Fourier Mellin transform is a geometric transform that warps the image frequency domain data from a Cartesian Coordinate System to a log polar coordinate system. As depicted in the plot 206 shown in FIG. 2, this transform sweeps through the transformed image data along a line at angle θ, mapping the data to a log polar coordinate system shown in the next plot 208. The log polar coordinate system has a rotation axis, representing the angle θ, and a scale axis. Inspecting the transformed data at this stage, one can see the orientation points of the watermark begin to be distinguishable from the noise component of the image signal.

Next, the detector performs a correlation 210 between the transformed image block and the transformed orientation signal 212. At a high level, the correlation process slides the orientation signal over the transformed image (in a selected transform domain, such as a spatial frequency domain) and measures the correlation at an array of discrete positions. Each such position has a corresponding scale and rotation parameter associated with it. Ideally, there is a position that clearly has the highest correlation relative to all of the others. In practice, there may be several candidates with a promising measure of correlation. As explained further below, these candidates may be subjected to one or more additional correlation stages to select the one that provides the best match for the orientation pattern.

Figure 4:
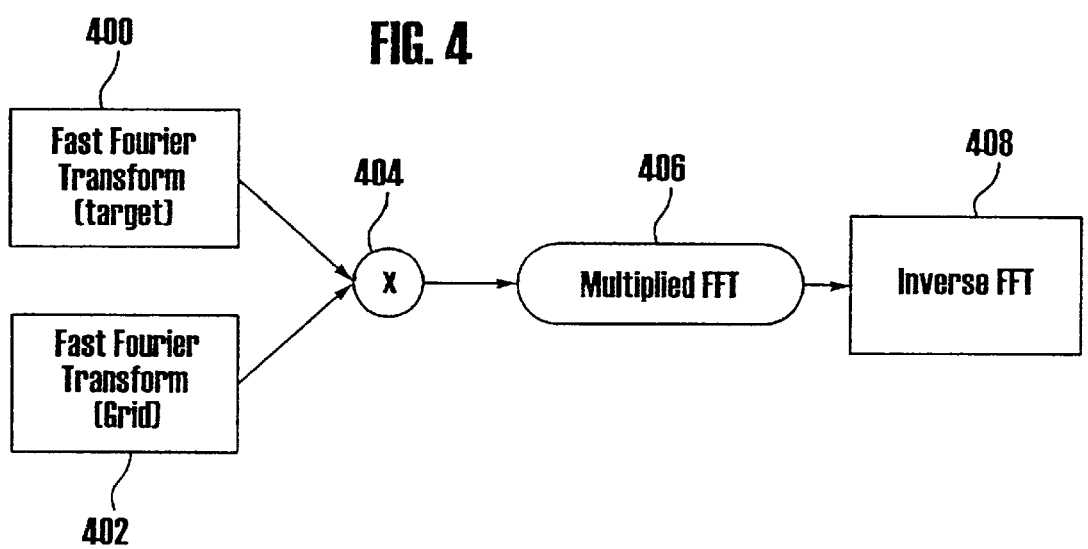
FIG. 4 illustrates an example of a generalized match filter used to correlate a watermark detection signal with a target image in the detection process.

There are a variety of ways to implement the correlation process. Any number of generalized matched filters may be implemented for this purpose. FIG. 4 depicts one such type of generalized matched filter. This filter, sometimes referred to as a Fourier Magnitude filter, performs an FFT on the target and the orientation signal (400, 402), multiplies the resulting arrays together to yield a multiplied FFT (406). The filtering operation is a form of convolution of the orientation signal with the target image. In particular, the filter repeatedly re-positions, multiplies the corresponding samples of the orientation signal and target, and accumulates the result at the corresponding location in the resulting array. Finally, it performs an inverse FFT (408) on the multiplied FFT to return the data into its original log-polar domain. The position or positions within this resulting array with the highest magnitude represent the candidates with the highest correlation.

When there are several viable candidates, the detector selects a set of the top candidates and applies an additional correlation stage. Each candidate has a corresponding rotation and scale parameter. The correlation stage rotates and scales the FFT of the orientation signal and performs a matching operation with the rotated and scaled orientation signal on the FFT of the target image. The matching operation multiplies the values of the transformed orientation signal (rotated and scaled) with sample values at corresponding positions in the Fourier magnitude data of the target image and accumulates the result to yield a measure of the correlation. The detector repeats this process for each of the candidates and picks the one with the highest measure of correlation. As shown in FIG. 2, the rotation and scale parameters (214) of the selected candidate are then used to find additional parameters that describe the orientation of the watermark in the target image.

The detector applies the scale and rotation to the target data block in the spatial domain 216 and then performs another correlation process between the orientation signal 218 and the scaled and rotated data block 216. The correlation process 220, in this example, is a generalized matched filter operation. It provides a measure of correlation for an array of positions that each has an associated translation parameter (e.g., an x, y position). Again, the location with the highest measure of correlation determines the translation parameters.

The phase attributes of an embedded code signal, such as the orientation signal, may be used to determine the position of the embedded code signal in a suspect media signal. Similarly, they may be used to determine translation of the media signal relative to its position at the time of encoding of the embedded code signal. Consider the case where the orientation signal has known phase attributes, such as components (e.g., impulse functions) with known phases. An example is the set of impulse functions with pseudo random phase described previously. To determine translation, the detector may apply phase only matching between the orientation signal and the suspect signal to find the location (or translation parameter(s)) where the phase attributes of both signals provide the best match. For example, matched filtering may be performed to determine the translation parameters (e.g., x and y position in a 2D signal) that provide the highest measure of correlation. Such phase matching may be performed in one (e.g., audio), two (e.g., image), or higher dimensional signals (e.g., video). This process may be used to determine the location of an embedded code signal in a suspect signal, and may also be used to determine a transformation that has been applied to a media signal subsequent to being encoded with the embedded code signal.

At this point, the detector has recovered the following orientation parameters: rotation, scale and translation. For many applications, these parameters may be sufficient to enable accurate reading of the watermark. In a watermark read operation, the reader applies the orientation parameters to re-orient the target image and then proceeds to extract the watermark signal. In some applications, the watermarked image may be stretched more in one spatial dimension than another. This type of distortion is sometimes referred to as differential scale or shear. Consider that the original image blocks are square. As a result of differential scale, each square may be warped into a parallelogram with unequal sides. Differential scale parameters define the nature and extent of this stretching.

Differential Scale

There are several alternative ways to recover the differential scale parameters. One general class of techniques is to use the known parameters (e.g., the computed scale, rotation, and translation) as a starting point to find the differential scale parameters. Assuming the known parameters to be valid, this approach warps either the orientation signal or the target image with selected amounts of differential scale and picks the differential scale parameters that yield the best correlation.

Another approach to determination of differential scale is set forth in application Ser. No. 09/452,022.

Yet another approach is to perform log-log sampling to convert scale in each of two dimensions to translation in each of the two dimensions of the log-log sampled signal. Then, matched filtering between an orientation signal and the sampled signal can be used to find the scale parameters in each dimension that provide the best correlation.

Implementation Platforms

Figure 5:
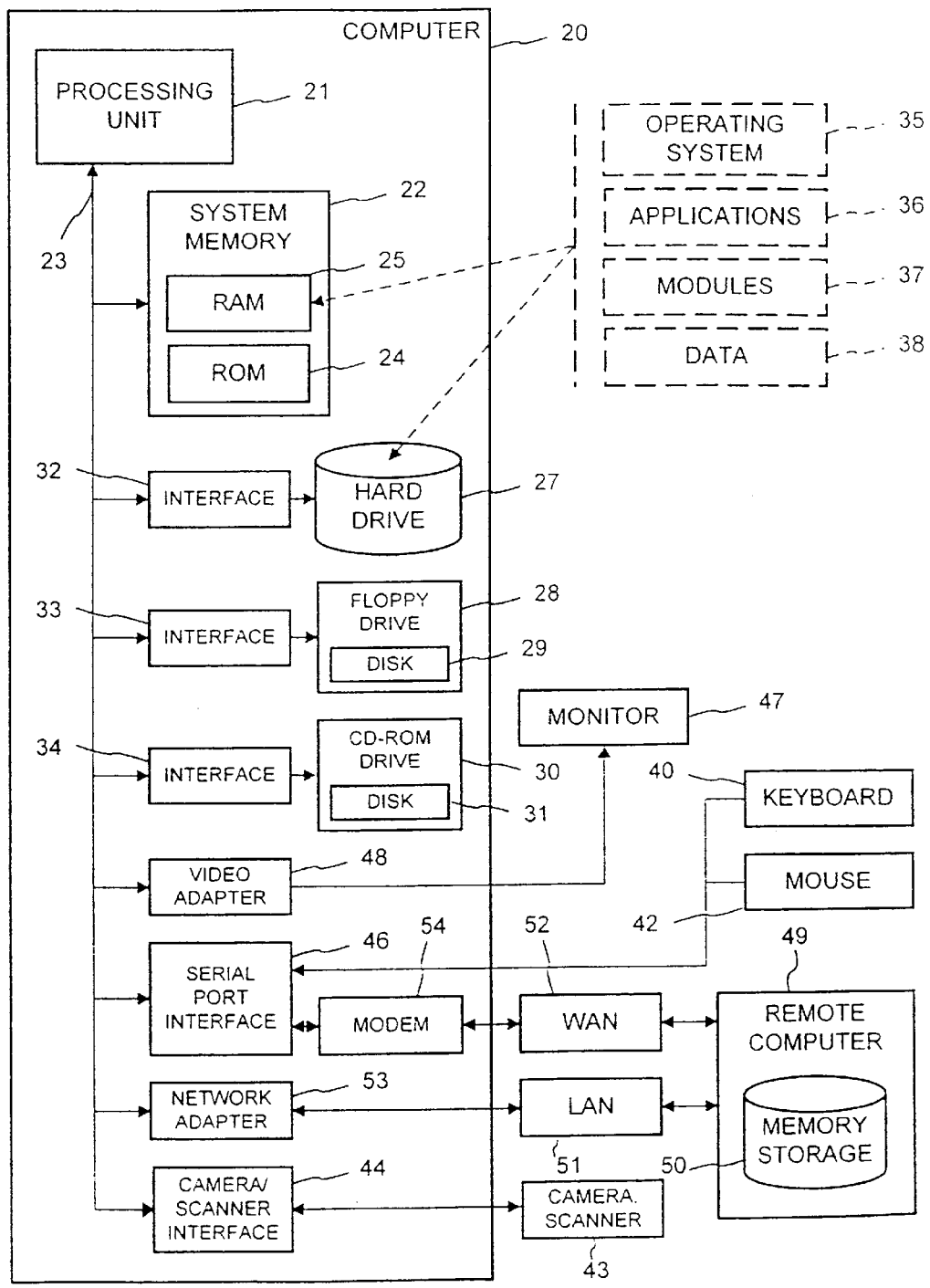
FIG. 5 illustrates a block diagram of a computer system that serves as an operating environment for an implementation of the invention.

FIG. 5 and the following discussion are intended to provide a brief, general description of a suitable computing environment in which the invention may be implemented. The invention is implemented in program modules comprising executable instructions that run on a computer. It may also be implemented in hardware (e.g., a ASIC) or a combination of hardware or software.

Generally, program modules include routines, programs, components, data structures, etc. that perform particular tasks or implement particular abstract data types. The invention may be ported to other computer system configurations, including hand-held devices, multiprocessor systems, microprocessor-based or programmable consumer electronics, minicomputers, mainframe computers, and the like. The invention may also be implemented in distributed computing environments where tasks are performed by remote processing devices that are linked through a communications network. In a distributed computing environment, program modules may be located in both local and remote memory storage devices.

FIG. 5 illustrates an example of a computer system that serves as an operating environment for the invention. The computer system includes a computer 520, including a processing unit 521, a system memory 522, and a system bus 523 that interconnects various system components including the system memory to the processing unit 521.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 524 and random access memory (RAM) 525. A basic input/output system 526 (BIOS), containing the basic routines that help to transfer information between elements within the computer 520, such as during start-up, is stored in ROM 524.

The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions (program code such as dynamic link libraries, and executable files), etc. for the computer 520.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 525, including an operating system 535, one or more application programs 536, other program modules 537, and program data 538.

A user may enter commands and information into the personal computer 520 through a keyboard 540 and pointing device, such as a mouse 542. Other input devices may include a microphone, joystick, game pad, satellite dish, digital camera, scanner, or the like. A digital camera or scanner 543 may be used to capture the target image for the detection process described above. The camera and scanner are each connected to the computer via a standard interface 544. Currently, there are digital cameras designed to interface with a Universal Serial Bus (USB), Peripheral Component Interconnect (PCI), and parallel port interface. Two emerging standard peripheral interfaces for cameras include USB2 and 1394 (also known as firewire and iLink).

These and other input devices are often connected to the processing unit 521 through a serial port interface 546 that is coupled to the system bus, but may be connected by other interfaces, such as a parallel port, game port or a universal serial bus (USB).

A monitor 547 or other type of display device is also connected to the system bus 523 via an interface, such as a video adapter 548. In addition to the monitor, personal computers typically include other peripheral output devices (not shown), such as speakers and printers.

The computer 520 operates in a networked environment using logical connections to one or more remote computers, such as a remote computer 549. The remote computer 549 may be a server, a router, a peer device or other common network node, and typically includes many or all of the elements described relative to the computer 520, although only a memory storage device 550 has been illustrated in FIG. 5. The logical connections depicted in FIG. 5 include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the personal computer 520 typically includes a modem 54 or other means for establishing communications over the wide area network 552, such as the Internet. The modem 554, which may be internal or external, is connected to the system bus 523 via the serial port interface 546.

In a networked environment, program modules depicted relative to the personal computer 520, or portions of them, may be stored in the remote memory storage device. It will be appreciated that the network connections shown are exemplary and that other means of establishing a communications link between the computers may be used.

Concluding Remarks

Having described and illustrated the principles of the invention with reference to specific implementations, it will be recognized that the principles thereof can be implemented in many other, different, forms. For example, the nature of the orientation parameters extracted during the detection process may vary. Also, the order in which these parameters are extracted may vary as well.

The specific matching techniques described above are only examples of suitable correlation processes. Instead of generalized matched filters, the correlation processes may be implemented using impulse matched filters. Some of the matching operations detailed above operate on data transformed into a frequency domain. The correlation processes may be performed in different domains, such as the spatial domain or temporal domain, and transform domains, including but not limited to wavelet, DCT, or Fourier transform domains.

To provide a comprehensive disclosure without unduly lengthening the specification, applicants incorporate by reference the patents and patent applications referenced above. The particular combinations of elements and features in the above-detailed embodiments are exemplary only; the interchanging and substitution of these teachings with other teachings in this and the incorporated-by-reference patents/applications are also contemplated.

We claim:

1. A method of extracting a digital watermark in a media signal comprising:
    performing a logarithmic sampling of the media signal to produce a sampled signal;
    analyzing the sampled signal to detect attributes associated with a watermark signal; and
    extracting the digital watermark based on detected attributes associated with the watermark signal.

2. The method of claim 1 wherein the logarithmic sampling is performed on a transform domain representation of the media signal.

3. The method of claim 1 wherein the attributes have pseudorandom properties.

4. The method of claim 1 wherein the logarithmic sampling is performed in two dimensions.

5. The method of claim 1 wherein the attributes include a symmetrical attribute.

6. A computer readable medium on which is stored instructions for performing the method of claim 1.

7. A method of extracting a digital watermark in an audio signal comprising:
    performing a logarithmic sampling of the media signal to produce a sampled signal;
    analyzing the sampled signal to detect attributes associated with a watermark signal; and
    extracting the digital watermark based on detected attributes associated with the watermark signal.

8. The method of claim 7 wherein the logarithmic sampling is performed on a transform domain representation of the audio signal.

9. The method of claim 8 wherein the transform domain representation comprises a frequency domain representation of the audio signal.

10. The method of claim 7 wherein the attributes include pseudorandom properties.

11. The method of claim 7 wherein the analyzing includes performing phase matching.

12. The method of claim 7 wherein the analyzing includes performing correlation.

13. The method of claim 7 wherein the attributes include a symmetrical attribute.

14. A computer readable medium on which is stored instructions for performing the method of claim 7.

15. A method of extracting a digital watermark in an image signal comprising:
    performing a polar sampling of the video signal to produce a sampled signal;
    analyzing the sampled signal to detect attributes associated with a watermark signal; and
    extracting the digital watermark based on detected attributes associated with the watermark signal.

16. The method of claim 15 wherein the polar sampling is performed on a transform domain representation of the media signal.

17. The method of claim 15 wherein the image signal comprises a video signal.

18. The method of claim 15 wherein the analyzing includes searching for a matching watermark signal pattern.

19. The method of claim 15 wherein the attributes include pseudorandom attributes.

20. The method of claim 15 wherein the attributes include a symmetrical attribute.

21. A computer readable medium on which is stored instructions for performing the method of claim 15.

22. A method of extracting a digital watermark in a media signal comprising:
    transforming the media signal to a transform domain;
    analyzing the transformed media signal to detect a symmetrical attribute associated with a watermark signal; and
    extracting the digital watermark based on detected attributes associated with the watermark signal.

* * * * *